(12) United States Patent
Fenney et al.

(10) Patent No.: US 7,733,352 B2
(45) Date of Patent: Jun. 8, 2010

(54) EFFICIENT BUMP MAPPING USING HEIGHT MAPS

(75) Inventors: Simon Fenney, Herts (GB); Paolo Giuseppe Fazzini, Herts (GB)

(73) Assignee: Imagination Technologies Limited, Hertfordshire (GB)

(*) Notice: Subject to any disclaimer, the term of this patent is extended or adjusted under 35 U.S.C. 154(b) by 31 days.

(21) Appl. No.: 11/228,876

(22) Filed: Sep. 16, 2005

(65) Prior Publication Data

US 2006/0109277 A1 May 25, 2006

Related U.S. Application Data

(63) Continuation of application No. 10/611,719, filed on Jul. 1, 2003, now abandoned.

(30) Foreign Application Priority Data

Apr. 15, 2003 (GB) ................................. 0308737.6

(51) Int. Cl.
*G09G 5/00* (2006.01)
(52) U.S. Cl. ................... 345/584; 345/426; 345/428; 345/582; 345/586; 345/609; 345/643; 382/260; 382/263; 382/264
(58) Field of Classification Search ................. 345/584, 345/586, 609, 643
See application file for complete search history.

(56) References Cited

U.S. PATENT DOCUMENTS 5,949,424 A    9/1999  Cabral et al.
6,765,584 B1*  7/2004  Wloka et al. ................. 345/584
6,850,244 B2*  2/2005  Munshi et al. ............... 345/584

FOREIGN PATENT DOCUMENTS

JP        9-231402 A      9/1997
WO        WO 99/09523     2/1999

OTHER PUBLICATIONS

Bikker, Jacco. "Bilinear Filtering (Interpolation)." Jan. 13, 1999. http://www.flipcode.com/articles/article_bilinearfiltering.shtml. Accessed Mar. 10, 2005.*
Peters, Jörg. "Biquartic C1-surface splines over irregular meshes." Computer-Aided Design. vol. 27, No. 12, p. 895-903. Jan. 26, 1995. Date accessed Aug. 4, 2006.*
Hast et al. "Reconstruction Filters for Bump Mapping" Journal of WSCG Univ. West Bohemia Czech Republic, Feb. 4, 2002-Feb. 8, 2002, pp. 9-12, XP002299248, ISSN: 1213-6972.*

(Continued)

*Primary Examiner*—Antonio A Caschera
(74) *Attorney, Agent, or Firm*—Flynn, Thiel, Boutell & Tanis, P.C.

(57) ABSTRACT

A method for generating bump map data substantially in real time for use in a 3-dimensional computer graphics system. Data is received which defines an area to which a texture is to be applied. Texture data to apply to the area is also received. This data includes surface height data. A set of partially overlapping samples of texture data are then filtered and surface tangent vectors derived therefrom. A bump map surface normal is then derived from the tangent vectors.

8 Claims, 7 Drawing Sheets

OTHER PUBLICATIONS

Loop et al., "Generalized B-spline surfaces of arbitrary topology", Proceedings of the 17th annual conference on Computer graphics and interactive techniques, ACM 1990, pp. 347-356.*

"What is texel?—a definition from WhatIs.com", http://whatis.techtarget.com/definition/0,,sid9_gci214519,00.html#. Last updated on: Apr. 5, 2005. Accessed on: Nov. 10, 2008.*

International Search Report, with Written Opinion of the International Searching Authority, mailed Oct. 20, 2004 in PCT International Application No. PCT/GB2004/001315 (11 pages).

Hast, A. et al. Reconstruction Filters for Bump Mapping, *Journal of WSCG Univ. West Bohemia Czech Republic*, Feb. 4, 2002-Feb. 8, 2002, pp. 9-12.

Ernst, I. et al., "Hardware-Supported Bump Mapping", *Computers and Graphics*,, Pergamom Press Ltd., Oxford, Great Britain, vol. 20, No. 4, (Jul. 1, 1996), pp. 515-521.

Loe, K.F., "A sinusoidal polynomial spline and its Bezier blended interpolant", *Journal of Computational and Applied Mathematics*, vol. 71 (Jul. 27, 1996), pp. 383-393.

Malzblender, T. et al., "Polynomial Texture Maps", *Computer Graphics Proceedings, Siggraph*, New York, New York: ACM, U.S., Aug. 12, 2001, pp. 519-528.

Blinn, James F., *Simulation of Wrinkled Surfaces*, Caltech/JPL, SIGGRAPH 1978, pp. 286-292.

Peercy, Mark, at al, *Efficient Bump Mapping Hardware*, Silicon Graphics Computer Systems, SIGGRAPH 1997, pp. 303-306.

Williams, Lance, *Pyramidal Parametrics*, Computer Graphics, vol. 7, No. 3, Jul. 1983, pp. 1-11.

Farin, *Curves and Surfaces for CAGD, A practical guide*, pp. 33-35.

Mann, Stephen, et al, *Computing Values and Derivatives of Bézier and B-spline Tensor Products*, CAGD, vol. 12, No. 1, Feb. 1995.

United Kingdom Patent Office Application No. 0308737.6, Search Report, Sep. 2003.

U.S. Appl. No. 10/621,111, filed Jul. 2003.

* cited by examiner

A  direction of normals on a 'flat' triangle

B  example direction of a bumped normal at one point on the surface

EFFICIENT BUMP MAPPING USING HEIGHT MAPS

This is a continuation of Ser. No. 10/611,719, filed Jul. 1, 2003 now abandoned.

This invention relates to a method and apparatus for generating bump map data for use in a 3 dimensional computer graphics system.

BACKGROUND TO THE INVENTION

Figure 1:
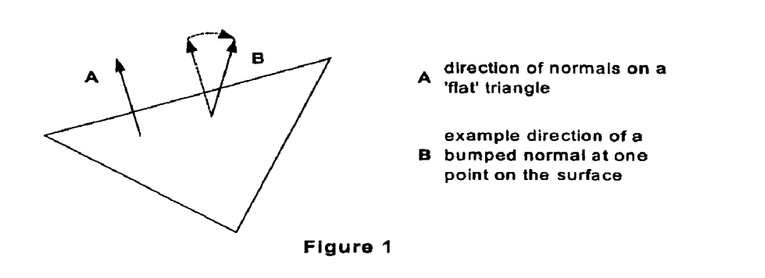
FIG. 1 shows the process of perturbing surface Normals as described by Blinn.

In the field of 3D computer graphics, detail is often added to otherwise smooth objects though the use of Bump Mapping, which was introduced by Blinn in his paper "*Simulation of Wrinkled Surfaces*" (SIGGRAPH 1978, pp 286-292). This operates by perturbing, on a pixel-by-pixel basis, an object's otherwise 'smoothly' varying surface normal vector. Because the surface's normal vector is used when computing the shading of that surface, its modification can give the appearance of bumps. FIG. 1 shows a surface normal being perturbed.

Figure 8A:
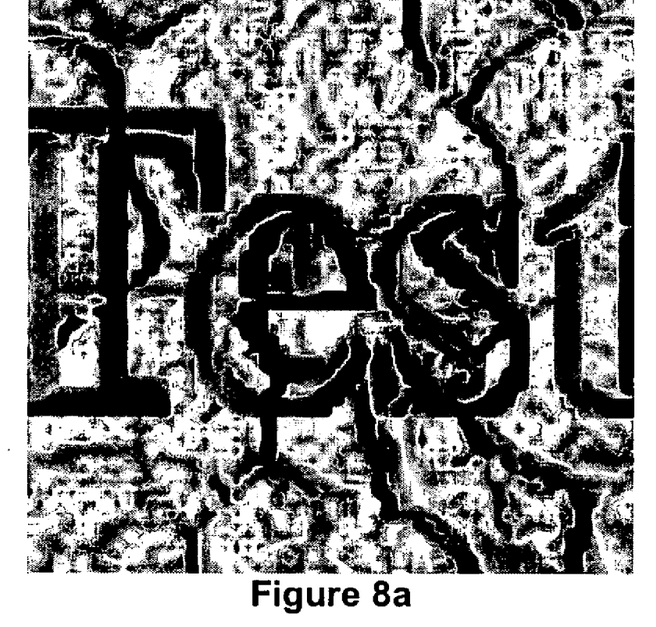

In Blinn's technique, each perturbation is computed by first taking derivates of a bump displacement texture or 'height map' and subsequently applying it to the original surface normal and surface tangent vectors. The height map is a simple array of scalar values that gives the 'vertical' displacement or 'height' of a surface at regular grid points relative to that surface. Typically these are represented by monochromatic image data, e.g. a bitmap, with the brightness of any pixel being representative of the 'height' at that point. Standard texture mapping practices are used to access the height data. The normal perturbations and lighting calculations are done in global or model space. FIG. 8*a* shows the application of Blinn's method to an 'illuminated' flat surface.

A more 'hardware friendly' method was later developed by Peercy et al ("Efficient Bump Mapping Hardware", SIGGRAPH 1997, pp 303-306, (also U.S. Pat. No. 5,949,424)). This directly stores perturbed surface normals in a texture map, often called a normal map. Unlike Blinn's method, these normals are defined in a local tangential coordinate space, which can be likened to the representation of parts of the earth's surface on a page in an atlas. In Peercy's technique, the lights used for shading are also transformed into this tangential space and thus the shading calculations are also computed locally. This process significantly reduces the number of calculations required when using bump mapping. It has become popular in recent 3D hardware systems and is sometimes known as 'Dot3 bump mapping'.

To minimize the texture memory and, more importantly, memory bandwidth required by this procedure, it is desirable to compress the normal maps. Unfortunately many of the commonly used texture compression schemes are not suitable as they cause a loss of information that, when applied to the special case of normal maps, can cause an unacceptable degradation in image quality. Two methods that are specifically tailored to normal maps, however, are described in our International patent application No. WO9909523—these typically still use 16 bits to represent each surface normal.

This then leaves the task of generating the normal map. One popular method again uses an initial height map, as originally described by Blinn. From that height map, a normal map can then be pre-computed, prior to rendering, by taking the cross product of the local derivative vectors of the height function sampled at regular positions. For cases where texture filtering is required, e.g. those based on the well-known MIP mapping techniques, the height map should be repeatedly down-sampled and the associated normal map regenerated to produce the multiple MIP map levels. Problems can arise, however, when applying the texture filtering techniques, e.g. bilinear or trilinear filtering, to normal maps.

Figure 2:
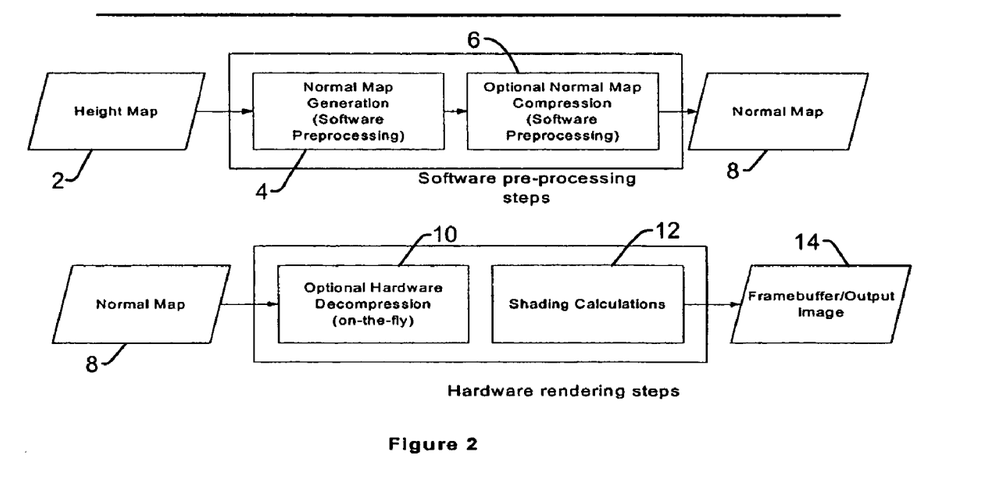
FIG. 2 shows a flow chart of the pipeline used for Peercy et al's method described above.

It should be noted that whereas the height map could be of relatively low precision—often as low as, say 8 or even 4 bits per pixel—the normal map may require 16 to 32 bits per pixel. The pre-processing steps of generating and compressing the normal map and the process of using the compressed normal map in 3D rendering are shown in FIG. 2. In the generation phase a height map 2 is used for normal map generation 4. An optional compression step 6 may then be used to produce an output map 8. in the use of the map 8, an optional decompression step is first performed on-the-fly before the map is used by shading calculations 12 to provide pixel data to an output frame buffer 14.

Also well known in the art is the aspect of texture filtering, primarily the application of bilinear or trilinear filtering, the latter as invented by Williams ("Pyramidal Parametrics", Lance Williams, Computer Graphics, Vol. 7, No. 3, July 1983, pp 1-11). Bilinear filtering is briefly discussed below, since trilinear filtering is just the blending of two bilinear operations.

Figure 3:
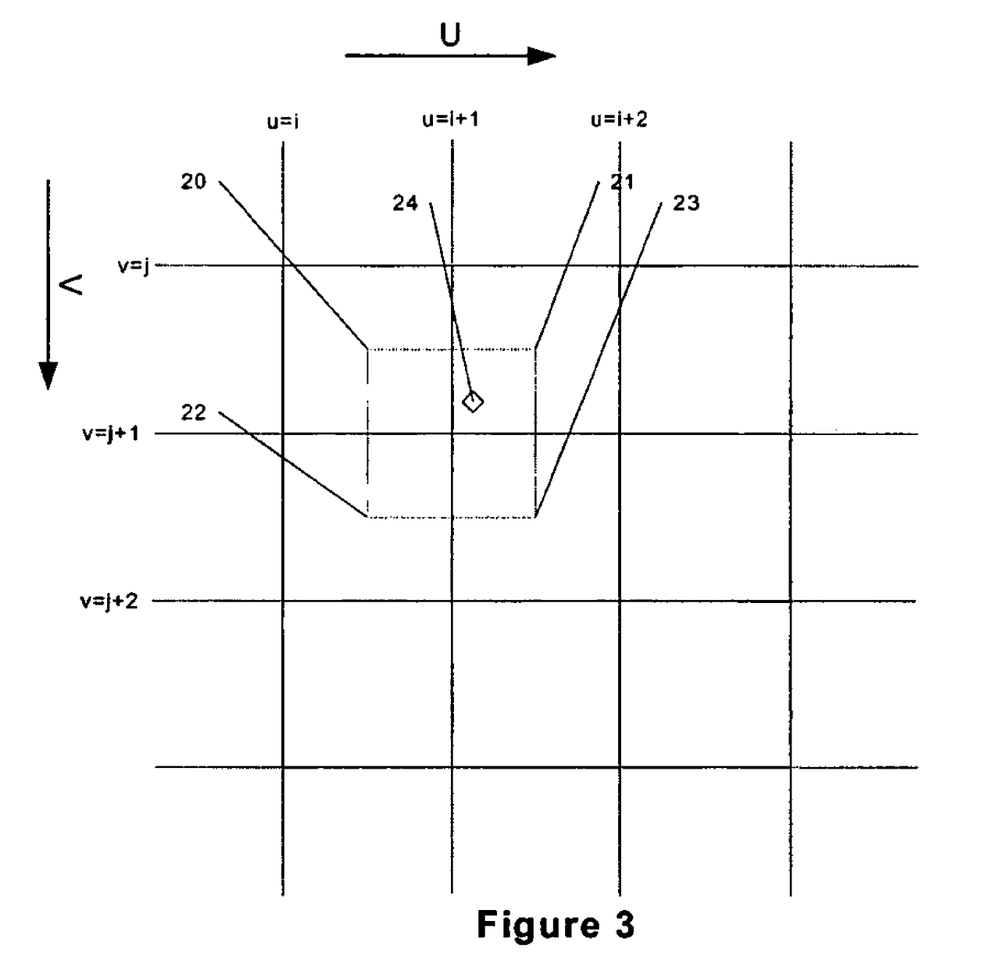
FIG. 3 shows the relationship of bilinear filtering of a texture to the texels of that texture.

A 2D texture can be considered to be a vector function of 2 variables (U, V). For simplicity in this discussion, we will assume that, for an N×N pixel texture, the values of U and V range from 0 to N. When bilinear filtering is applied, the pixel, or 'texel', values stored in the texture can be considered to be representative of the points in the centres of the respective texels, i.e. at coordinates (i+0.5, j+0.5), where i and j are integers and represent the texel coordinate of the particular texel. This is illustrated in FIG. 3 for texel (i,j), the centre of which is indicated by '20'. At this point in the texture, bilinear filtering will return the colour of that texel. Similarly, sampling at locations '21', '22', and '23' will return the colours of texels (i+1,j),(i,j+1), and (i+1,j+1) respectively. Now consider any sampling location within the square formed by '20', '21', '22', and '23', such as point '24'. Such a point has texture coordinates $(u_s, v_s)$ where $i+0.5 \leq u_s < i+1.5$ and $j+0.5 \leq v_s < j+1.5$. The texture values for any point in the square will be formed from a bilinear blend of the four surrounding texels.

In particular, the process used in the art will be some simple variation of the following:

U':=Us−0.5;// Place stored texel value at centre of texel
V':=Vs−0.5;
Ui:=floor(U');
Vi:=floor(V');
Ublend:=U'−Ui;
Vblend:=V'−Vi;
// Do 2 horizontal linear blends
Colour0:=LinearBlend(Texel(Ui, Vi), Texel(Ui+1, Vi), Ublend);
Colour1:=LinearBlend(Texel(Ui, Vi+1), Texel(Ui+1, Vi+1), Ublend);
// Do 1 vertical linear blend
Result:=LinearBlend(Colour0, Colour1, Vblend);

The Ublend and Vblend values are thus in the range [0 . . . 1), and can be most conveniently represented by a fixed point number of, say, 8 to 16 bits precision.

Figure 4A:
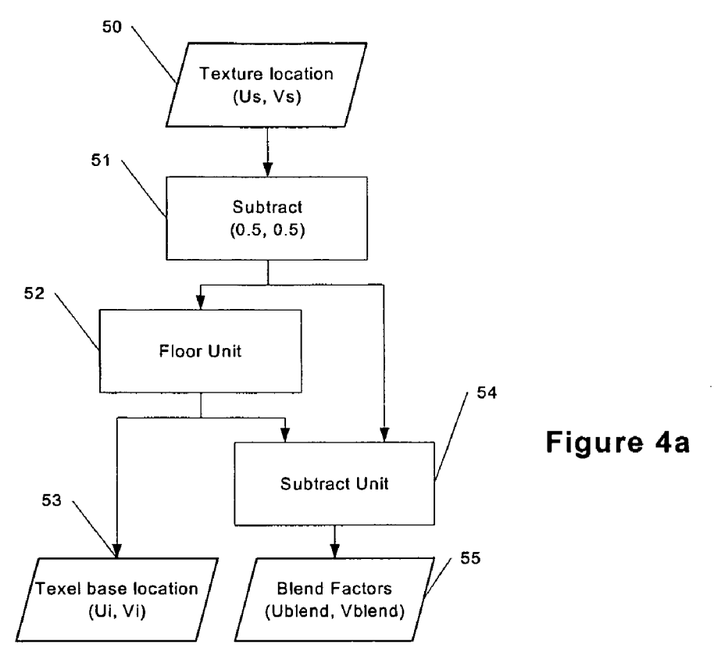
FIG. 4*a* shows an overview coordinate calculation device in typical prior art bilinear hardware.

FIG. 4*a* shows hardware, typical in the art, that performs the first steps of the above bilinear algorithm. The requested sample position is input, '50', and the positions adjusted by ½ a texel, '51' via a subtraction. The 'floors' of the coordinate values are computed, '52', and these define the texel integer coordinates, '53', for the top left texel of the required set of 4 texels. The values are also subtracted, '54', from previous values to produce the blending factors for the bilinear operation, '55'.

It should be noted that the colours in 3D computer graphics are usually 4-D entities, having Red, Green, Blue, and Alpha (i.e. transparency) components. When the bilinear blending described above is performed, all four components of the various colour values are operated on in parallel. This is shown in the second stage of the bilinear operation in FIG. 4b. The integer texel coordinates computed in '53', are used to access the four neighbouring texels, '60' thru '63'. Each of these has its own Red, Green, Blue, and Alpha components. In the example, there are four (usually identical) bilinear units, '65' thru '68', each of which computes one of the four colour channels using the blend factors, '55'. The individual scalar results are then recombined into the one resulting colour, '69'.

Another known aspect of 3D computer graphics is that of fitting smooth surfaces through or near a set of control points. In particular we are interested in two types known as uniform B-spline and Bezier splines, as described in literature such as "Computer Graphics. Principles and Practice" (Foley et al) or "Curves and Surfaces for CAGD. A practical guide" (Farin).

Figure 5:
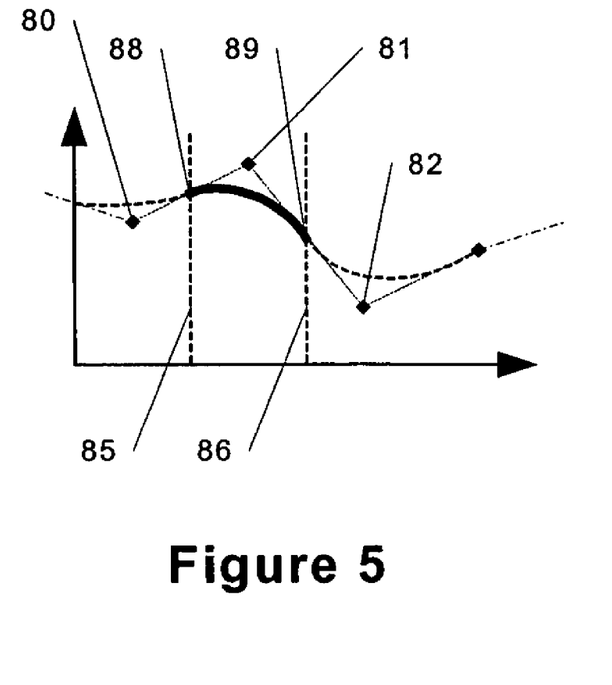
FIG. 5 shows a segment of a piecewise quadratic B-spline curve, or equivalently, a section through a bi-quadratic B-spline Surface.

Of particular interest to this application is the case of a bi-quadratic B-spline which has C1 continuity (i.e. continuous first derivative). A bi-quadratic B-spline also has the property that, for any point on the surface, a sub-grid of 3×3 control points is needed to evaluate that point and/or derivatives at that point. A one-dimensional slice though a section of a quadratic B-spline is shown in FIG. 5. The points, '80', '81', and '82' can be considered to be three adjacent control points in a row of the grid. The region of the curve between '85', and '86' depends only on these three control values (and the neighbouring 6 values in the 3×3 sub-grid in the case of a bi-quadratic surface).

One popular way of evaluating such a curve is to first convert it to the equivalent Bezier representation, i.e. a different set of 3 control points, and then apply the de Casteljau algorithm which uses repeated linear interpolation (see Farin). For the simple case of quadratic curves, this amounts to using a new set of control points which are '88', '81' (i.e., it is re-used), and '89'. Points '88' and '89' are just the mid points of the connecting line segments and could be found by simple averaging.

Figure 6:
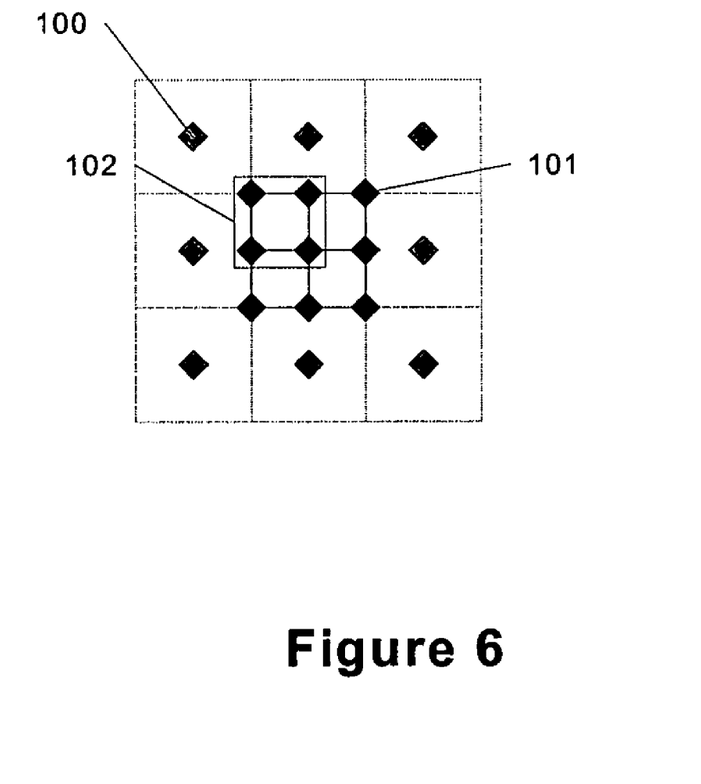
FIG. 6 shows a plan view of a section of a height map being interpreted as a bi-quadratic B-spline surface.

For the conversion of a bi-quadratic B-spline surface, the 3×3 grid of control points can be replaced by an equivalent set of 3×3 Bezier control points. An example showing the situation for a bi-quadratic surface is shown, in plan form, in FIG. 6. The original 9 B-spline control points, one example of which is shown by '100', are converted into the equivalent Bezier control points, such as '101'. Stating this more precisely, if the grid of 3×3 B-spline points are:

$$\begin{bmatrix} a & b & c \\ d & e & f \\ g & h & k \end{bmatrix}$$

then the equivalent set of Bezier points are computed from:

$$\begin{bmatrix} a' & b' & c' \\ d' & e' & f' \\ g' & h' & k' \end{bmatrix} = \begin{bmatrix} \frac{1}{2} & \frac{1}{2} & 0 \\ 0 & 1 & 0 \\ 0 & \frac{1}{2} & \frac{1}{2} \end{bmatrix} \begin{bmatrix} a & b & c \\ d & e & f \\ g & h & k \end{bmatrix} \begin{bmatrix} \frac{1}{2} & 0 & 0 \\ \frac{1}{2} & 1 & \frac{1}{2} \\ 0 & 0 & \frac{1}{2} \end{bmatrix} \quad \text{Equation 1}$$

$$= \begin{bmatrix} \frac{a+b+d+e}{4} & \frac{b+e}{2} & \frac{b+c+e+f}{4} \\ \frac{d+e}{2} & e & \frac{e+f}{2} \\ \frac{d+e+g+h}{4} & \frac{e+h}{2} & \frac{e+f+h+k}{4} \end{bmatrix}$$

Referring again to FIG. 6, the region of interest is the central 'square', i.e. a position specified by (u,v), where 0≦u, v≦1. In the case of a bi-quadratic surface, one method based on de Casteljau would be to bi-linearly interpolate sets of 2×2 neighbouring control points, using (u,v) as weights, to produce a new set of 2×2 intermediate control points. One of the four sets of 2×2 intermediate control points is indicated by '102'. These four results are, in turn, bilinearly interpolated, again using the (u,v) weights, to produce the surface point. If tangents to the surface are required, a method such as given by Mann and Rose ("Computing values and derivatives of Bezier and B-spline tensor products", CAGD, Vol 12, February 1995) can be used. For the bi-quadratic case, this can be done by performing additional linear interpolations using the 2×2 intermediate control values. Finally, taking the cross product of these tangents generates the surface normal.

The height map defines 'height' values only at certain sample locations and so a means of computing the height surface at other points is required. In particular, bump mapping requires the surface normal which, in turn, usually implies the need for surface tangents. Blinn points out that the surface height is not actually required and proposes a function that only computes tangents. He notes that in order to avoid discontinuities in the shading, his tangent functions are continuous. Using the 3×3 grid of height samples shown in 6, Blinn's function performs 3 bilinear blends respectively of the top left, top right, and bottom left neighbours, and then computes the differences of the top left and top right result and the top left and bottom left result as part of the tangent generation.

Figure 8B:
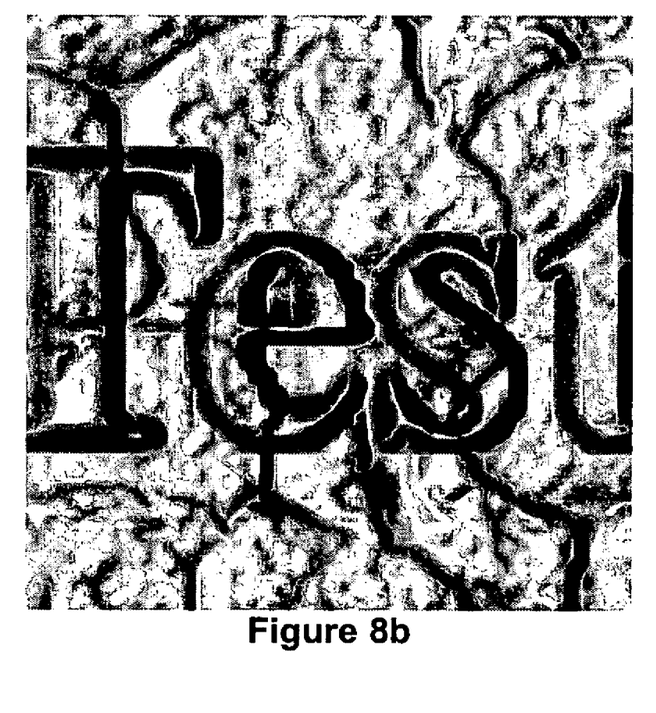
FIG. 8*b* shows the function used by a preferred embodiment.

Although Blinn's function results in a continuous normal, its derivative can have discontinuities. Unfortunately, the human visual system is very sensitive to changes in the derivative of image intensity, and so 'artefacts' can be seen. The method also tends to emphasise the underlying grid of the height map, which can be seen in FIG. 8a. (For the sake of comparison, FIG. 8b illustrates the result from a preferred embodiment of the present invention).

Although the introduction of Peercy et al's pre-perturbed normal map method makes bump mapping more practical in real-time hardware, it still requires 'large' texture formats as well as the separate pre-processing step to convert a height map to normal map. The 'large' texture formats consume valuable bandwidth as well as memory and cache storage and, although special normal map compression techniques exist, these formats are still often larger than the original source height map. Also filtering of the normal map may also be problematic.

A further limitation of Peercy et al's technique is that dynamic bump mapping, i.e. where the bump heights are computed frame-by-frame, is far more difficult to achieve.

For example, the height values may be generated as the result of a separate rendering pass. The pre-processing step, including generation of the various MIP map levels, may take too much time to allow real-time rendering.

Finally, it is beneficial to use a height function with C2 (or higher) continuity so that the normal interpolation is C1 (or higher). In particular, it is important to have an inexpensive means of producing this function.

SUMMARY OF THE INVENTION

We have appreciated that it is possible to implement, in hardware, an additional set of functions that provides an efficient means for direct transformation of a height map into filtered perturbed surface normals that have C1 continuity. These normals can subsequently be used for various rendering purposes such as per-pixel lighting. In particular, we have devised a method which, by re-using colour texture filtering hardware that is ubiquitous in today's graphics systems in a new way with the addition of some small processing units, achieves the functions needed to compute the normal from a smooth surface controlled by a set of heights. Thus the data can be generated substantially in real time.

The filtered surface normals are created 'on demand' and are not stored. This provides the joint benefits of reducing the amount of texture data and bandwidth needed for bump mapping, as well as overcoming some of the issues with the filtering of normal maps. This feature is also important when using dynamic height maps in real-time rendering since a pre-processing step may be prohibitive.

Embodiments of the invention keep the advantages of computing bump map-based shading in local tangent space as described by Peercy et al, (although it is not restricted to doing so), with the convenience of directly using Blinn's height map but with the option of using a function with higher continuity.

Preferred embodiments of the invention will now be described in detail by way of example with reference to the accompanying diagrams in which:

FIG. 8*a* shows the results of bumping mapping using Blinn's height map derivative function, while

DETAILED DESCRIPTION OF PREFERRED EMBODIMENT

The preferred embodiment will now be described. Access is provided to height map textures, which store an array of height values, using preferably 4 or 8 bits per texel. Each value will encode a fixed-point number with some number of fraction bits—preferably ¼ of the bits will be assigned to the fractional part.

The embodiment fits a bi-quadratic B-spline through this set of points, thus giving the virtual height map texture C1 continuity (i.e. continuous first derivatives). In FIG. 5, the points '80', '81', and '82' represent three adjacent height values/control points in a row of the height map. The value in the texture is allocated (preferably) to the y dimension while the other coordinate values (i.e., x and z) are implicitly defined by the texel's coordinate position. Alternative embodiments may assign these dimensions in some other permutation. The other control points needed for the surface in the texel region are shown, in plan form, in FIG. 6.

Figure 7:
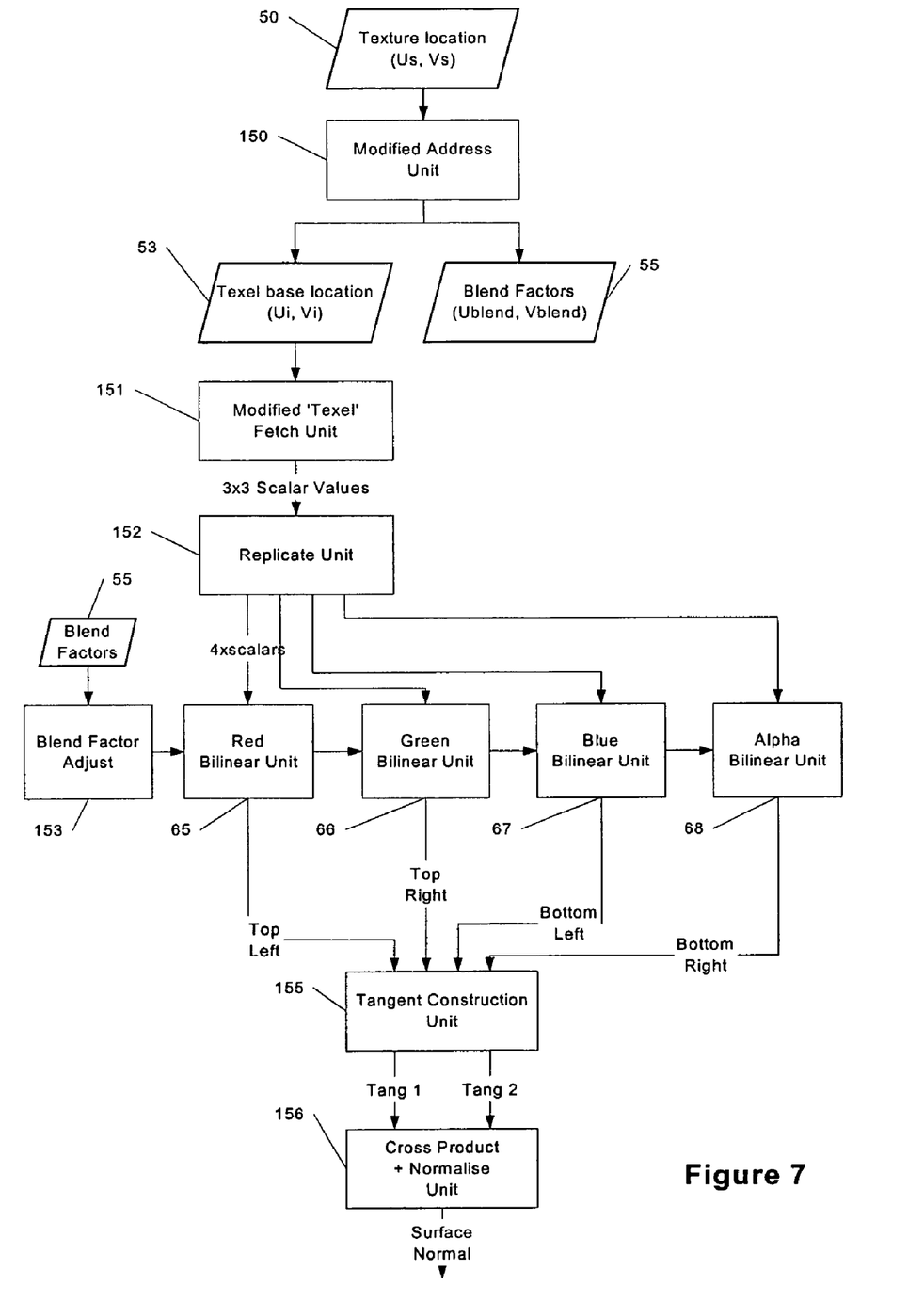
FIG. 7 shows an overview of a hardware system embodying the invention with modifications to support normal generation from height maps.

The manner in which the normal is computed is now described with reference to FIG. 7. As with the standard texture filtering system described above, i.e. FIGS. 4*a* and 4*b*, it is assumed that the texture base coordinates to which the texture is to be applied will be calculated and supplied as before, at '50'. Modified address unit '150' then computes the 'base' texture coordinate, '53', and blend factors '55', in a manner that is similar to the prior art method described with reference to FIG. 4*a*, except that step '51', the typical subtraction of a half-texel dimension, is bypassed when performing height map bump mapping.

Figure 4B:
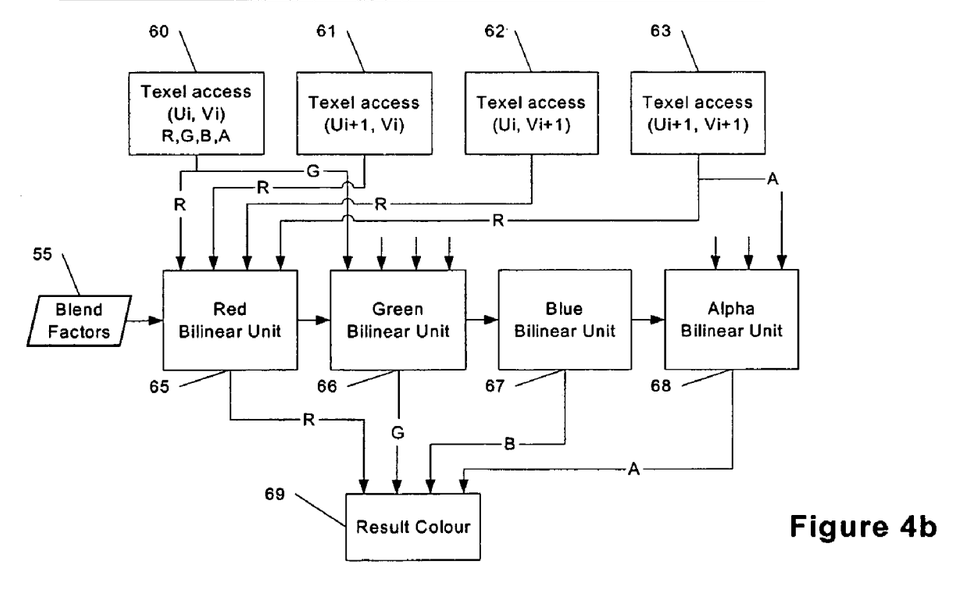
FIG. 4*b* shows an overview of prior art hardware that applies the bilinear blending to the addressed texels.

A modified texel fetch unit, '151', which in FIG. 4*b* consisted of units '60' thru '63' which obtained four sets of RGBA vectors, is enhanced to be able to fetch a 3×3 set of scalar height values. In particular, it retrieves the following grid of height texels:

$$\begin{bmatrix} (U_i-1, V_j-1) & (U_i, V_j-1) & (U_i+1, V_j-1) \\ (U_i-1, V_j) & (U_i, V_j) & (U_i+1, V_j) \\ (U_i-1, V_j+1) & (U_i, V_j+1) & (U_i+1, V_j+1) \end{bmatrix} = \begin{bmatrix} a & b & c \\ d & e & f \\ g & h & k \end{bmatrix}$$

For brevity, these have be renumbered a, b, etc.

It will be apparent to those skilled in the art that, with application of the address-bit interleaved texture storage format described in our British patent number GB2297886, such a height-map can be packed into the 'equivalent', in terms of storage, of a colour texture of ½×½ resolution of the height map. Each 2×2 group of scalar height data would occupy the space of a single four-dimensional colour. With such a format, the height map data can then be accessed using a very simple modification of exactly the same fetch mechanism used by units '60' thru '63' in FIG. 4*a*.

The 3×3 grid of samples is then fed into the 'Replicate' unit, 152, which outputs values to the Red, Green, Blue, and Alpha bilinear units. In particular, the Red channel receives the top left grid of 2×2 scalar values, i.e. those fetched from . . .

$$\begin{bmatrix} a & b \\ d & e \end{bmatrix}$$

. . . while similarly the green channel receives the top right set, the blue, the bottom left, and the alpha receives the bottom right. Clearly some values, such as b' or e', will be used more than once, thus the grids supplied to each unit overlap at least partially.

Unit 153 takes the blend factors, '55', and computes new sets of U and V blends as follows:

$$Ublend_0 = \frac{1}{2} + \frac{Ublend}{2}$$

$$Ublend_1 = \frac{Ublend}{2}$$

$$Vblend_0 = \frac{1}{2} + \frac{Vblend}{2}$$

$$Vblend_1 = \frac{Vblend}{2}$$

As Ublend and Vblend are typically fixed point numbers, it should be appreciated that these 'calculations' are completely trivial and incur no cost at all in hardware.

These new blend values are distributed to bilinear units, '65' thru '68' as follows:

Red: (Ublend0, Vblend0)
Green: (Ublend1, Vblend0)
Blue: (Ublend0, Vblend1)
Alpha: (Ublend1, Vblend1)

This manipulation of the blend factors eliminates the need to convert from the quadratic B-spline control points to the Bezier control points, as described previously in Equation 1. These bilinear units therefore effectively produce data which will enable surface normals with C1 continuity to subsequently be derived.

The results of the 4 bilinear interpolations are fed to the tangent construction unit, 155. This generates two tangent vectors, Tang1 and Tang2, which are functionally equivalent to using the following calculations:

Tang1 $[X]$:=1 Texturesize;

Tang1 $[Y]$:=LinearInterpolate(VBlend, GreenResult−RedResult, AlphaResult−BlueResult);

Tang1 $[Z]$:=0;

Tang2 $[X]$:=0;

Tang2 $[Y]$:=LinearInterpolate(UBlend, BlueResult−RedResult, AlphaResult−GreenResult);

Tang2 $[Z]$:=1 Texturesize

... where

LinearInterpolate $(x, A, B)$ :=$A+x*(B−A)$;

For reasons that will soon be apparent, unit 155 actually only outputs three values: Tang1[y], Tang2[y] and 1 Texturesize.

Finally, in unit '156', the cross product of these tangents is computed. It should be noted that if the preferred embodiment is chosen, the presence of zeros in the tangent components simplifies the cross product to the following calculation:

$N$ $[x]$:=Tang1 $[y]$;

$N$ $[y]$:=1 Texturesize $N$ $[z]$:=Tang2 $[y]$;

This vector is then normalised, preferably by squaring the N vector, computing the inverse of the square root of the result, and multiplying that scalar by the original components. The normalisation step may appear expensive, but it would be a requirement of any system that supported compressed normal maps, such as that described in WO9909523 or British patent application No. 0216668.4. Thus, if such texture formats were already supported, the re-normalisation hardware would be reused. An example of the output of this embodiment is shown in FIG. 8b.

In an alternative embodiment, trilinear filtering can be adapted to support normal generation—the only difference in procedure will be that the values fed into tangent construction unit '155' will be a 'blend' of the values computed from two adjacent MIP map levels chosen. Other embodiments supporting improved anisotropic filtering are also feasible.

In another embodiment, an interpolated scale factor may be applied to the deltas/tangents before normalisation so that a height map can be scaled differently for different models or different parts of the same model.

In another embodiment, the blend factor adjust unit, 153, is not used and the B-spline control points are converted to the equivalent Bezier representations according to Equation 1 in a modified '152' unit.

In another embodiment, the actual interpolated height value would be computed by including a third linear blending operation.

In another embodiment, Blinn's height interpolation function could be employed. In this embodiment, the blend factor adjust unit, 153, is not used and it is unnecessary to use the bilinear 'alpha' channel. That also implies that it is unnecessary to fetch source texel 'k'. The tangent unit, 155, then simplifies to compute the difference of 'green' and 'red' and the difference of 'blue' and 'red'.

Figure 9:
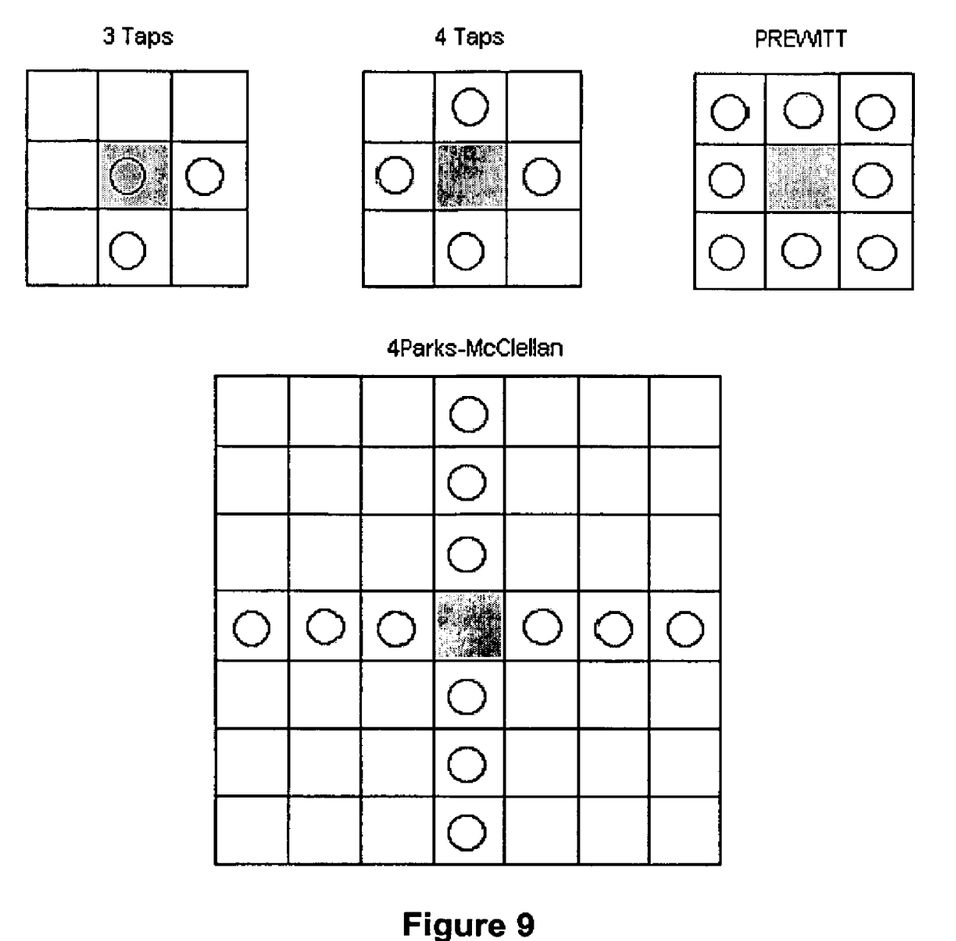
FIG. 9 shows some alternative filter patterns that could be used for computing derivatives of a bump map.

In another alternative embodiment, dedicated sampling hardware could be included that takes numerous texture samples and applies an alternative derivative filter such as 4 taps, Sobel, Prewitt, Parks-McClellan derivatives filters as represented in FIG. 9.

In another embodiment, colour textures are also filtered using bi-quadratic B-splines, either through the addition of bilinear filtering units, or by iterations through the colour channels, whereby the individual weights to the bilinear units are adjusted according to the previously described embodiments.

The invention claimed is:

1. A method for generating bump map data substantially in real time for use in a 3-dimensional computer graphics system comprising the steps of:
   receiving data defining an area to which a texture is to be applied, using a data receiver;
   receiving texture data to apply to the area, the texture data including surface height data, using a texture data receiver;
   filtering each of a set of partially overlapping samples of the texture data, using a filter, the filtering step including a step of using bi-quadratic B-splines to model height surfaces from the surface height data;
   deriving surface tangent vectors from the filtered samples, using a surface tangent vector generator; and
   deriving a bump map surface normal from the surface tangent vectors, using a bump map surface normal generator.

2. The method according to claim 1, wherein the tangent vectors are defined in local tangent space.

3. The method according to claim 1, wherein the filtering step includes the step of using existing hardware in the color channels of the 3-dimensional graphics system to filter the overlapping samples of the texture data.

4. The method according to claim 1, wherein the filtering step is modified with blending factors.

5. An apparatus for generating bump map data substantially in real time for use in a 3-dimensional computer graphics system comprising:
- means for receiving data defining an area to which a texture is to be applied;
- means for receiving texture data to apply to the area, the texture data including surface height data;
- means for filtering each of a set of partially overlapping samples of the texture data, including means to use bi-quadratic B-splines to model height surfaces from the surface height data;
- means for deriving surface tangent vectors from the filtered samples, with the surface tangent vectors being defined in local tangent space; and
- means for deriving a bump map surface normal from the surface tangent vectors.

6. The apparatus according to claim 5, wherein the filtering means includes means for using existing hardware in color channels of the 3-dimensional graphics system to filter the overlapping samples of the texture data.

7. The apparatus according to claim 5, wherein the filtering means is modified for filtering with blending factors.

8. A method for generating bump map data for use in a 3-dimensional computer graphics system comprising the steps of:
- receiving data defining an area to which a texture is to be applied, using a data receiver;
- receiving texture data to apply to the area, the texture data including surface height data, using a texture data receiver;
- filtering each of a set of partially overlapping samples of the texture data, using a filter, so as to model a height surface based on the surface height data;
- deriving surface tangent vectors from the filtered samples, using a surface tangent vector generator; and
- deriving a bump map surface normal from the surface tangent vectors, using a bump map surface normal generator.

* * * * *